June 5, 1923.
J. S. REYNOLDS
PRESSURE REGULATING VALVE
Filed Oct. 24, 1921
1,457,937
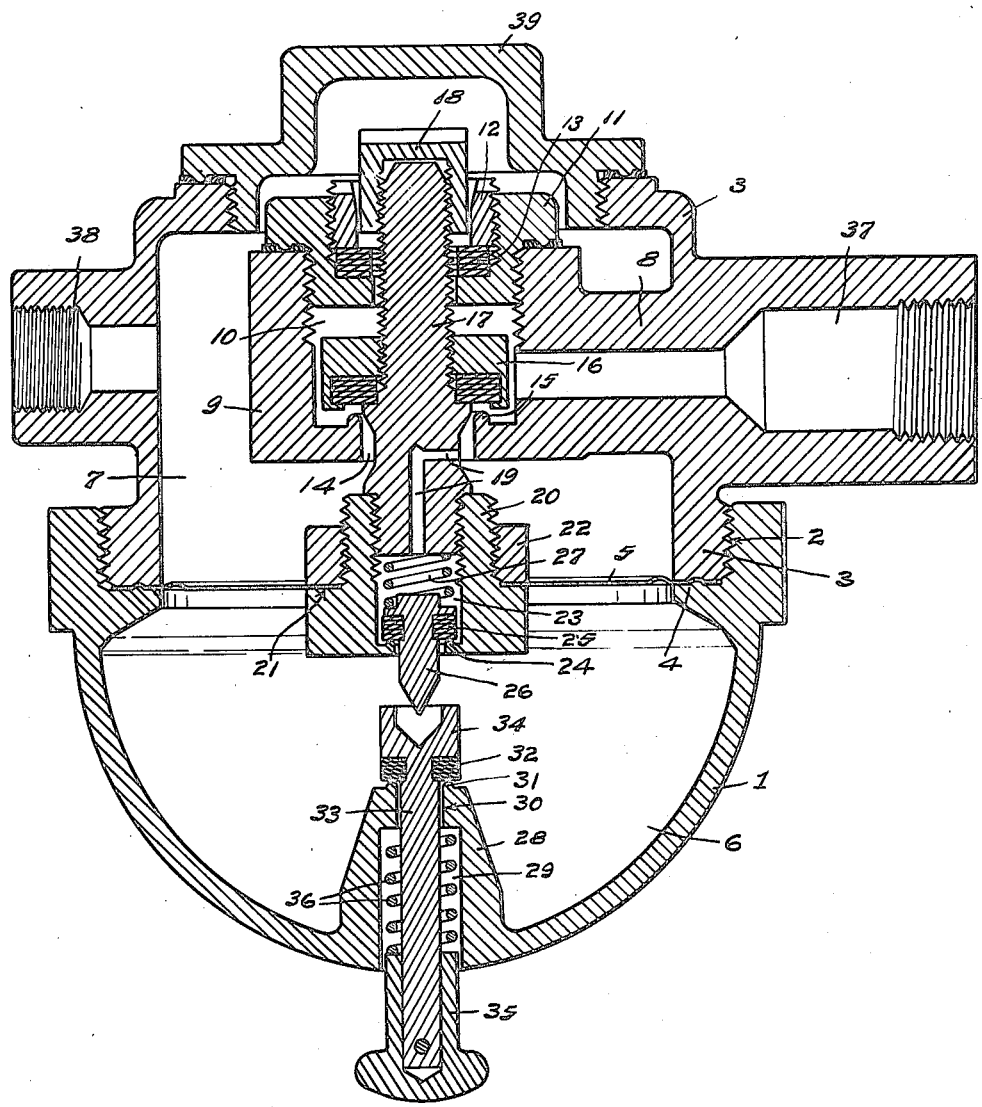
Inventor
Joy S. Reynolds
Attorney
Frank Warren Patented June 5, 1923.

1,457,937

UNITED STATES PATENT OFFICE.

JOY S. REYNOLDS, OF SAN FRANCISCO, CALIFORNIA, ASSIGNOR TO REYNOLDS TORCH AND REGULATOR CO., OF SEATTLE, WASHINGTON.

PRESSURE-REGULATING VALVE.

Application filed October 24, 1921. Serial No. 509,818.

*To all whom it may concern:*

Be it known that I, JOY S. REYNOLDS, a citizen of the United States, residing at San Francisco, in the county of San Francisco and State of California, have invented a certain new and useful Improvement in Pressure-Regulating Valves, of which the following is a specification.

My invention relates to improvements in pressure regulating valves of the type in which the flow of fluid therethrough is governed by valve members that are arranged to be opened and closed by the movement of a flexible diaphragm that divides the interior of the valve housing into a service chamber and a regulating chamber.

The object of my improvement is to provide simple, efficient and easily operated means for adjusting the fluid pressure within the regulating chamber of the valve housing to thereby govern the working pressure of the fluid within the service chamber of such valve housing.

Another object is to provide a pressure regulating valve of this type that is simple in construction and efficient in operation and that is not expensive to manufacture.

With the above and other objects in view my invention consists in the novel construction, adaptation and combination of parts of a pressure regulating valve as will be more clearly hereinafter described and claimed.

I accomplish these objects by devices illustrated in the accompanying drawings in which the figure is a view in vertical mid-section of a pressure regulating valve constructed in accordance with this invention.

The valve disclosed is particularly well adapted for use in connection with a conduit through which gas is conducted from a high pressure storage receptacle or tank and is delivered at a reduced pressure at the point of consumption.

Referring to the drawings I have shown a two part valve casing comprising a lower semi-globular portion 1, that is internally threaded at its open end as at 2, for the reception of the externally threaded end of an upper portion 3. The portion 1 is provided near the open end with an annular internal flange 4 upon which a flexible diaphragm 5 is adapted to rest, the peripheral edge of the diaphragm 5 being securely clamped between such flange 4 and the annular end of the upper housing portion 3 and such diaphragm serving to partition or divide the valve casing into a regulating chamber 6, within the housing portion 1, and a service chamber 7, within the housing portion 3.

Projecting inwardly from the side wall of the housing portion 3, is integral tubular shank 8 that terminates in an enlarged portion 9 having a valve chamber 10 therein. The upper end of the valve chamber 10 is internally threaded for the reception of a fitting 11, which fitting is recessed on its top side and is internally threaded for the reception of a tubular collar 12 that is tightened on to and serves to hold a valve seat member 13.

Intersecting the bottom of the valve chamber 10 is a passageway 14 of smaller diameter than such valve chamber that is provided around its upper edge with an annular bead 15 that forms a seat for a valve 16 that is adjustably secured on a stem 17. The upper end of the stem 17 has a valve 18 adjustably screwed thereon, the valve 18 being arranged to work within an axial recess in the collar 12 and being adjusted so that it will engage with the seat 13 simultaneously with the engagement of the valve 16 with the bead or seat 15.

The lower end of the stem 17 is securely screwed into a tubular fitting 20 that projects upwards through an opening in the center of the diaphragm 5. The fitting 20 is provided with an annular shoulder 21 below the diaphragm 5 and is externally threaded above the diaphragm for the reception of a nut 22 by which the fitting is securely clamped to the diaphragm.

The fitting 20 is provided with a valve chamber 23, at the bottom of which is an inwardly directed annular flange 24 that forms a seat for a valve member 25, on a stem or plug 26. The valve member 25 is normally held in contact with the seat 24, by a compression spring 27. Communication between the service chamber 7 and the valve chamber 23 is had by means of an angular passageway 19 in the valve stem 17.

Projecting upwardly into the regulating chamber 6 is a centrally arranged integral shank 28 having an axial tubular bore 29 that extends upwardly from the bottom thereof and is intersected at the top end by a smaller tubular bore 30. Formed on the top end of the shank 28 and surrounding the bore 30 is an annular bead or seat 31 for the reception of a valve member 32 that is secured on a stem 33 that extends lengthwise through the bores 29 and 30 and is provided on its upper end with a head 34.

The bottom end of the stem 33 is removably secured to a finger piece 35 that is of slightly smaller diameter than the bore 29 and projects thereinto. The valve member 32 is normally held in contact with the seat 31 by a compression spring 36 that is interposed between the end of the bore 29 and the end of the finger piece 35.

The head 34 of the stem 33 is recessed as at 36 and is adapted to engage with the stem 26 to unseat the valve 25 when the finger piece 35 is moved to the limit of its upward movement.

The housing portion 3 is provided with a fluid inlet 37 that communicates with the interior of the valve chamber 10 and is further provided with a fluid outlet 38 that communicates with the service chamber 7. The top side of the housing portion 3 is provided with a relatively large opening that is closed by a removable screw cap 39 that affords easy access to the service chamber 7. The fitting 11 is large enough so that when it is removed the valve chamber 10 is easily accessible. The stem 17 is of considerably smaller diameter than any of the passageways through which it extends so that fluid may pass freely from the valve chamber 10 to the service chamber 7 when the valves 16 and 18 are unseated.

In operation the fluid inlet 37 is connected with a source of supply of fluid under pressure as with a tank in which gas is stored. As the fluid under pressure fills the service chamber 7, the diaphragm 5, will be deflected downwardly and will close the valves 16 and 18. The tendency of the fluid pressure in the service chamber 7 to close the valves 16 and 18, may be offset by admitting fluid under pressure to the regulating chamber. This is done by pressing inwardly on the finger piece 35 and unseating the valve 25 so that fluid under pressure may flow through the passageway 19 and valve chamber 23 into the regulating chamber 6. When the finger piece 35 is pressed inwardly the valve member 32 will of course be unseated but the passageway around the stem 33 is of such small area that the fluid cannot escape as fast as it enters the regulating chamber 6, so that the pressures in the regulating chamber and service chamber may be substantially equalized thus permitting the diaphragm to hold the valves 16 and 18 in an open position when pressure on the finger piece 35 is released.

The pressure in the regulating chamber 6 may be reduced at any time by opening the valve 32 without opening the valve 25.

From the foregoing description it will be apparent that when the pressure in the service chamber is substantially greater than the pressure in the regulating chamber the diaphragm 5 will be deflected downwardly and the valves 16 and 18 will be closed thus shutting off the inlet of fluid to the service chamber, and it will also be apparent that the pressure within the regulating chamber will determine the pressure at which the diaphragm will be deflected and will thus govern the pressure in the service chamber.

The pressure within the fluid inlet conduit 37 is ordinarily very much greater than the pressure within the service chamber 7 and in use it is not practical to pass the fluid directly from the high pressure conduit 37 to the regulating chamber 6, but, it is practical to regulate the pressure in the regulating chamber 6 by passing the fluid at the lower pressure directly from the service chamber 7 to the regulating chamber 6.

In practice a pressure gauge not shown may be connected with the service chamber 7 to indicate the pressure therein.

The pressure in the valve chamber 10 tends at all times to exert a downward pressure on the valve member 16 and an upward pressure on the valve member 18, which owing to the fact that both of such valves are secured on the same stem, results in a practically balanced relation so that the valves are easily moved by distortion of the diaphragm 5, and are sensitive to slight variations in the relative pressures within the regulating and service chambers 6 and 7, respectively.

The valve 25 also acts as a check valve to relieve excess pressure in the regulating chamber 6 in case the pressure within the service chamber 7 drops enough below the pressure in the regulating chamber so that the compression of the spring 27 is overcome.

From the foregoing description taken in connection with the accompanying drawings, the form of construction and method of operation of my pressure regulating valve will be readily understood, but, while I have described the principle of operation of the invention together with the device which I now consider to be the best embodiment thereof, it will be understood that the device shown is merely illustrative and that such changes in the construction thereof may be resorted to as are within the scope of the following claims.

What I claim is:

1. A pressure regulating valve comprising a housing, a flexible diaphragm dividing said housing into a service chamber and regulating chamber, means actuated by the movement of said diaphragm for controlling the inlet of fluid under pressure to said service chamber, a valve provided in said diaphragm, another valve provided in the wall of said regulating chamber, and means on the exterior of said housing for moving said last named valve into engagement with said valve in said diaphragm to open one or both of said valves.

2. A pressure regulating valve comprising a housing, a flexible diaphragm dividing said housing into a service chamber and a regulating chamber, a fluid outlet for said service chamber, a fluid inlet for said service chamber, a tubular fitting for said diaphragm, valve mechanism connected with said tubular fitting and controlling the opening and closing of said fluid inlet, a check valve disposed within said tubular fitting for opening and closing a passageway between said service chamber and said regulating chamber said check valve having a stem that projects into said regulating chamber, an integral tubular shank projecting into said regulating chamber in axial alignment with said fitting in said diaphragm, a valve stem extending through said shank, a valve on the inner end of said valve stem and arranged to seat on the inner end of said shank, and a spring for urging said valve stem outwardly said valve stem being arranged to engage the stem of said check valve and open said check valve when said valve stem is pressed inwardly.

In witness whereof, I hereunto subscribe my name this 13th day of October, A. D. 1921.

JOY S. REYNOLDS.